United States Patent

Bukal et al.

Patent Number: 6,058,221
Date of Patent: May 2, 2000

[54] ELECTRON BEAM PROFILE MEASUREMENT METHOD AND SYSTEM

[75] Inventors: Branko Bukal, Thornhill; Reza Safaee-Rad, Mississauga; Karoly G. Nemeth, Don Mills, all of Canada

[73] Assignee: Image Processing Systems, Inc., Markham, Canada

[21] Appl. No.: 09/008,641

[22] Filed: Jan. 16, 1998

[51] Int. Cl.[7] ................................................ G06K 9/36
[52] U.S. Cl. .................................... 382/286; 348/191
[58] Field of Search ........................... 382/286, 284, 382/168; 348/190, 191, 189

[56] References Cited

U.S. PATENT DOCUMENTS

| | | | |
|---|---|---|---|
| 3,723,801 | 3/1973 | Oxenham | 315/11.5 |
| 3,962,722 | 6/1976 | Ciciora | 358/10 |
| 3,975,766 | 8/1976 | Sano et al. | 348/807 |
| 4,001,877 | 1/1977 | Simpson | 358/10 |
| 4,035,834 | 7/1977 | Drury | 348/191 |
| 4,330,779 | 5/1982 | Wilensky et al. | 340/705 |
| 4,415,921 | 11/1983 | Mulvanny et al. | 358/139 |
| 4,575,753 | 3/1986 | Mistry et al. | 358/118 |
| 4,602,272 | 7/1986 | Duschl | 358/10 |
| 4,635,095 | 1/1987 | Legrand et al. | 358/10 |
| 4,688,079 | 8/1987 | Fendley | 358/10 |
| 4,751,570 | 6/1988 | Robinson | 358/88 |
| 4,754,329 | 6/1988 | Lindsay et al. | 358/139 |
| 4,760,444 | 7/1988 | Nielson et al. | 358/101 |
| 4,814,858 | 3/1989 | Mochizuki et al. | 358/10 |
| 4,893,925 | 1/1990 | Sweeny et al. | 356/72 |
| 4,925,420 | 5/1990 | Fourche et al. | 445/3 |
| 5,032,769 | 7/1991 | Kawakami | 315/368 |
| 5,049,791 | 9/1991 | Kawakami | 315/368 R |
| 5,216,504 | 6/1993 | Webb et al. | 358/139 |
| 5,260,627 | 11/1993 | Yokota et al. | 315/400 |
| 5,339,010 | 8/1994 | Urata et al. | 315/368.17 |
| 5,371,537 | 12/1994 | Bohan et al. | 348/181 |
| 5,404,164 | 4/1995 | Hassler et al. | 348/182 |
| 5,557,297 | 9/1996 | Sharp et al. | 345/136 |
| 5,583,401 | 12/1996 | Inoue et al. | 315/370 |
| 5,642,175 | 6/1997 | Hirakawa | 348/806 |
| 5,969,756 | 10/1999 | Buckley et al. | 348/190 |

FOREIGN PATENT DOCUMENTS

| | | |
|---|---|---|
| 0120767 | 10/1984 | European Pat. Off. . |
| 404700 | 12/1990 | European Pat. Off. . |
| 2255700 | 11/1992 | United Kingdom . |
| WO92/08868 | 5/1992 | WIPO . |
| WO95/34906 | 12/1995 | WIPO . |

OTHER PUBLICATIONS

T. Hibara and M. Hayashi, "Automatic Adjustment for Color Display Monitor", Proceedings IECON '86 (IES of IEEE, Sep. 29, 1986).

S. Kim, D. Han and Z. Bien, "Design and Implementation of an Automatic Adjustment System for Integrated Tube Components", *Mechatronics* (Feb. 4, 1994) No. 1, Head. Hill, Hall, Oxford GB.

*Primary Examiner*—Yon J. Couso
*Attorney, Agent, or Firm*—Connolly Bove Lodge & Hutz LLP

[57] ABSTRACT

In a method of measuring electron beam profile in an electronic display device, a matrix of video dots is displayed on a display screen of the electronic display device, each of the video dots being comprised of a group of phosphor dots illuminated by an electron beam. An image of a plurality of groups of illuminated phosphor dots forming the video dots within a field of view is then taken. The average horizontal and vertical distances of the video dots within the filed of view is determined and the groups of illuminated phosphor dots forming the video dots in the field of view that are captured in the image are superimposed based on the average horizontal and vertical distances of the video dots generally to average and fill in discontinuities between phosphor dots in the groups and thereby generate an overlay image of the electron beam. Cross-sections of the overlay image can be approximated and at least one intensity profile of the electron beam calculated. Overlay images of each color electron beam can also be captured simultaneously and a convergence error calculated.

32 Claims, 5 Drawing Sheets

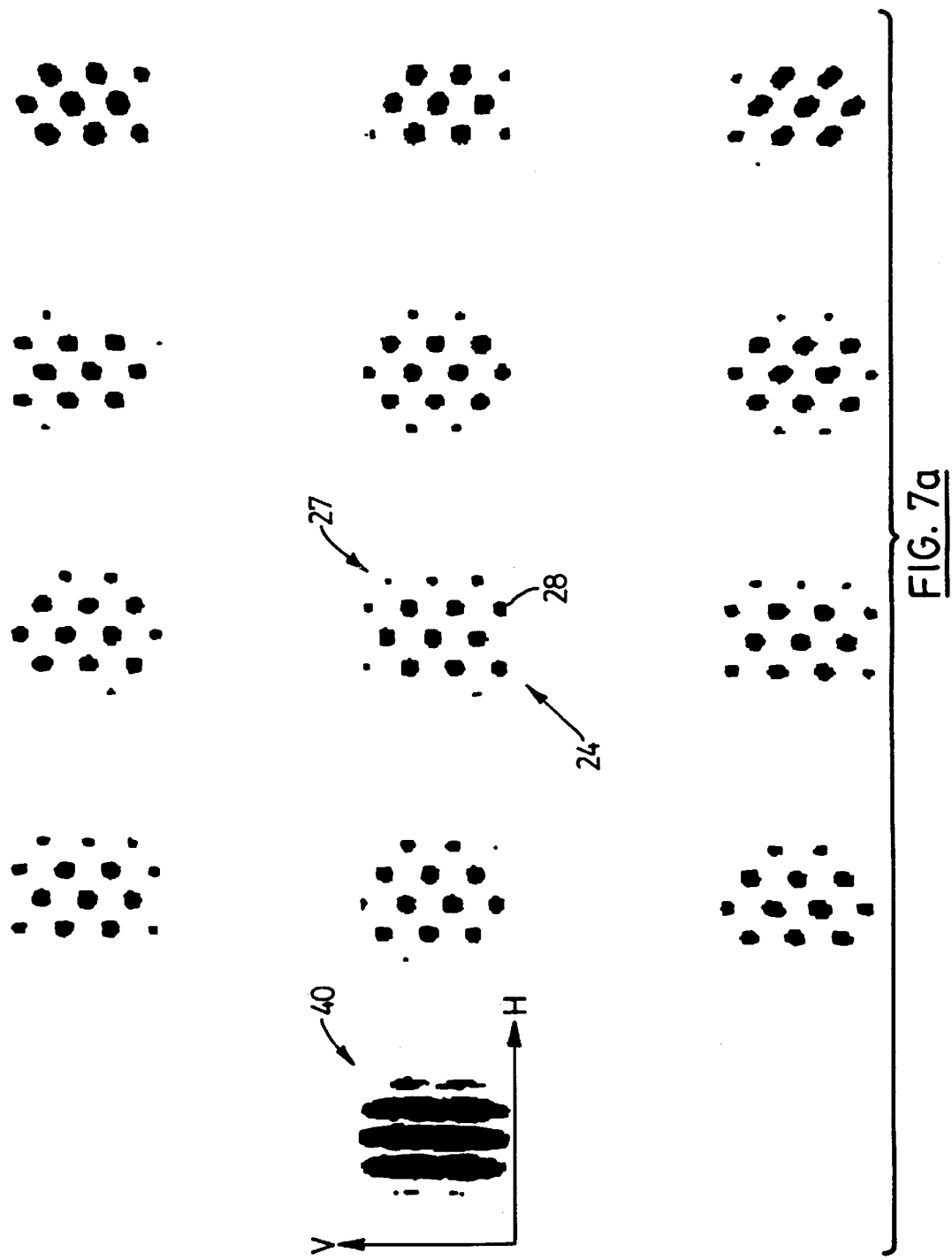

ELECTRON BEAM PROFILE MEASUREMENT METHOD AND SYSTEM

FIELD OF THE INVENTION

The present invention relates to testing systems and in particular to a method and system for measuring electron beam profile to evaluate focus and/or convergence in an electronic display device.

BACKGROUND OF THE INVENTION

During the manufacture and assembly of electronic display devices such as for example cathode ray tube (CRT) assemblies for computer monitors and television sets, precise mechanical, magnetic and electronic adjustments are required to ensure the electronic display devices provide optimum reproduction image quality. These adjustments include, but are not limited to, focus, purity of color, convergence of beams, color uniformity, geometry and luminance.

In today's computer environment, high resolution electronic display devices are required and therefore, during manufacture it is necessary to ensure the electronic display devices provide high resolution and image quality. This has made visual inspection of electronic display devices to evaluate resolution and image quality unsatisfactory.

Focus and convergence errors in electronic display devices, which decreases resolution and image quality, are a result of deviations in the profile of the electron beams. Therefore, during testing it is necessary to measure electron beam profile so that focus and convergence corrective measures can be taken. Unfortunately, precise measurement of convergence and focus of electron beams in electronic display devices is hampered by the shadow mask and either the phosphor stripes or phosphor dots therein.

methods to measure electron beam profile in an electronic display device are known. For example, Minolta has developed a CB-150 system to analyze focus in an electronic display device by measuring electron beam profile. The system includes a processing unit having a built in video generator, a measuring head and a personal computer. In operation, an electron beam is generated within the electronic display device and the light emitted by three phosphor lines within the electronic display device is detected by a CCD camera in the measuring head. The electron beam is then shifted to the left by 80 µm and the light emitted by the three phosphor lines is detected by the CCD camera again. Thereafter, the electron beam is shifted to the right by 160 µm and the light emitted by the three phosphor lines is detected by the CCD camera yet again. By shifting the electron beam and measuring the color output of the phosphor lines, the profile of the electron beam, which is hidden by the separation of the phosphor lines, can be approximated.

Although this system allows the electron beam profile to be measured to evaluate focus in an electronic display device, the system is slow inhibiting electron beam profile measurements to be made in real time. Accordingly, an improved method and system of measuring electron beam profile in an electronic display device is desired.

It is therefore an object of the present invention to provide a novel method and system for measuring electron beam profile to evaluate focus and/or convergence in an electronic display device.

SUMMARY OF THE INVENTION

According to one aspect of the present invention there is provided a method of measuring electron beam profile in an electronic display device comprising the steps of:

displaying a matrix of video dots on a display screen of said electronic display device, each of said video dots being comprised of a group of phosphor dots illuminated by an electron beam;

taking an image of a plurality of groups of illuminated phosphor dots forming said video dots within a field of view;

determining average horizontal and vertical distances of said video dots within said field of view; and superimposing each of said groups of illuminated phosphor dots forming the video dots in said field of view captured in said image based on the average horizontal and vertical distances of said video dots generally to average and fill in discontinuities between phosphor dots in said groups and thereby generate an overlay image of said electron beam.

Preferably, cross-sections of the overlay image are taken and at least one intensity profile of the electron beam is generated. In a preferred embodiment, both horizontal and vertical intensity profiles of the electron beam are generated. It is also preferred that the dimensions of the horizontal and vertical intensity profiles at a percentage threshold of the maximum intensity of the overlay image are calculated.

In a preferred embodiment, the cross-sections are approximated by calculating best fit ellipses encircling the phosphor dots at predefined intensity levels. This is achieved using Fourier elliptical decomposition.

In another embodiment, during the display step, a matrix of red, green and blue video dots is displayed by illuminating respective groups of phosphor dots by red, green and blue electron beams. During the superimposing step, groups of illuminated phosphor dots constituting the video dots of each color are superimposed separately to generate overlay images of the red, green and blue electron beams. It is also preferred that the spatial distribution of the red, green and blue electron beams based on the overlay images is compared and a convergence error is calculated therefrom.

According to another aspect of the present invention, there is provided a system for measuring electron beam profile in an electronic display device comprising:

a video pattern generator to drive said electronic display device to cause said electronic display device to display a matrix of video dots on a display screen thereof, each of said video dots being comprised of a group of phosphor dots illuminated by an electron beam;

a sensor to take an image of a plurality of groups of illuminated phosphor dots forming said video dots within a field of view; and a processor in communication with said sensor and receiving said image therefrom, said processor processing said image to determine average horizontal and vertical distances of the video dots within said field of view and superimposing each of said groups of illuminated phosphor dots forming the video dots in said field of view captured in said image based on the average horizontal and vertical distances of the video dots generally to average and to fill in discontinuities between phosphor dots in said groups and thereby generate an overlay image of said electron beam.

The present invention provides advantages in that the electron beam profile data is processed and displayed at a significantly increased speed as compared to prior art systems allowing calculated electron beam profile data to be viewed in real time.

BRIEF DESCRIPTIONS OF THE DRAWINGS

Embodiments of the present invention will now be described more fully with reference to the accompanying drawings in which:

FIGS. 7a and 7b illustrate groups of phosphor dots constituting illuminated video dots and resulting overly images for different set-up conditions.

DETAILED DESCRIPTION OF THE PREFERRED EMBODIMENTS

Figure 1:
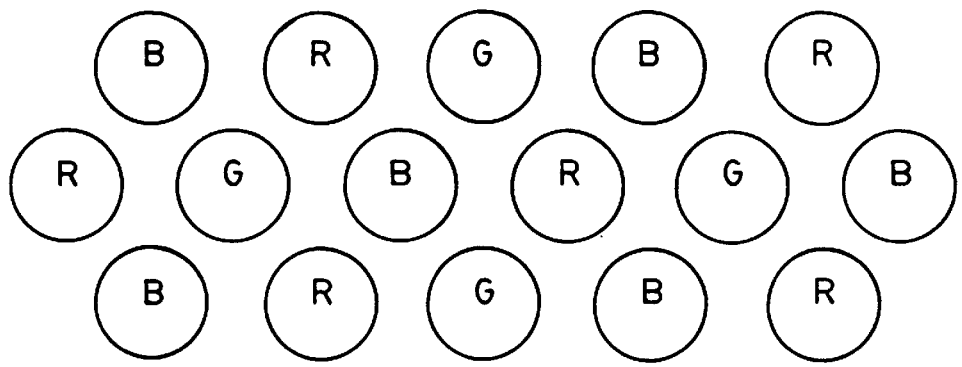
FIG. 1 is an illustration of a portion of a phosphor dot matrix within an electronic display device in the form of a color display device.

Referring now to FIG. 1, the phosphor dot pattern on the inside surface of the front display panel of an electronic display device in the form of a color display device is shown. The phosphor dot pattern includes a matrix of red, green and blue phosphor dots R, G and B. As is well known, a shadow mask is positioned between the matrix of phosphor dots and the electron guns of the electronic display device. The electron beam pertaining to the red, green and blue phosphor dots is deflected vertically and horizontally to scan progressively the entire front display panel during a vertical scan time period and thereby illuminate the respective phosphor dots.

Ideally, when the electron guns generate electron beams, the electron beams pass through the shadow mask and impinge directly on the corresponding phosphor dots resulting in maximum intensity light being emitted by the phosphor dots. It is also desired for the profile of the electron beam to be shaped so that the phosphor dots are illuminated in such a manner that the displayed information is properly focused.

Therefore, during testing of electronic display devices, it is desired to measure the profile of the electron beams so that adjustments can be made to the test conditions or driving electronics of the electronic display devices to alter the profile of the electron beams and thereby improve focus in the electronic display devices. In addition, it is desired to measure the profile of the electron beams so that defective electronic display devices that do not and/or are not capable of meeting specifications can be objectively identified. An embodiment of the present method and system for measuring electron beam profile in an electronic display device will now be described with particular reference to FIGS. 2 to 7b.

Figure 2:
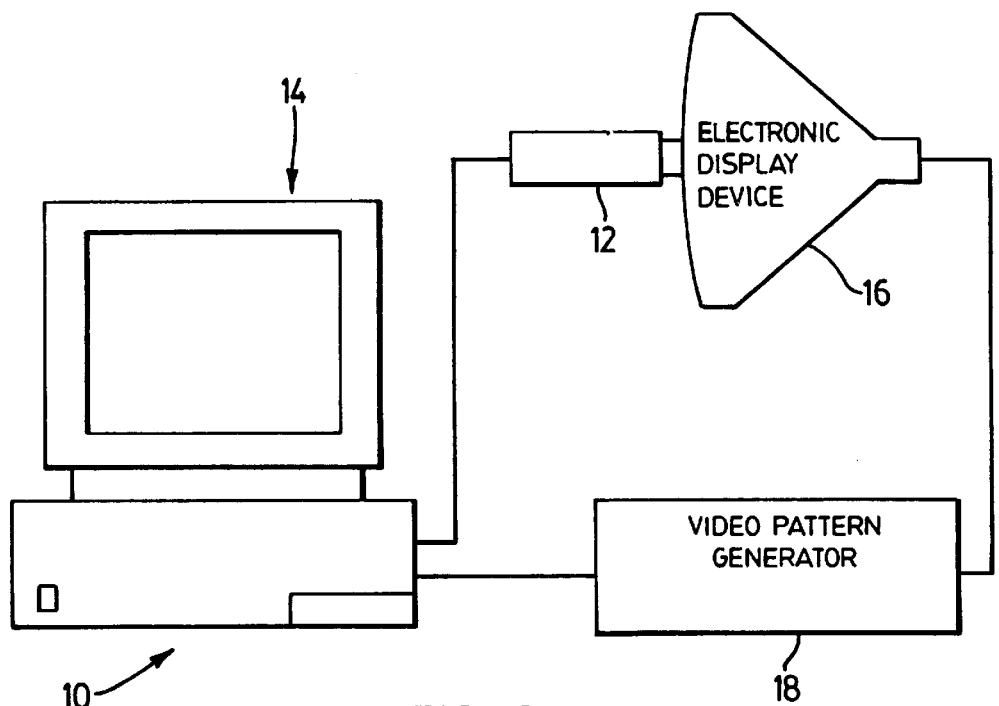
FIG. 2 is an illustration of a system to measure electron beam profile in an electronic display device in accordance with the present invention.
Figure 3:
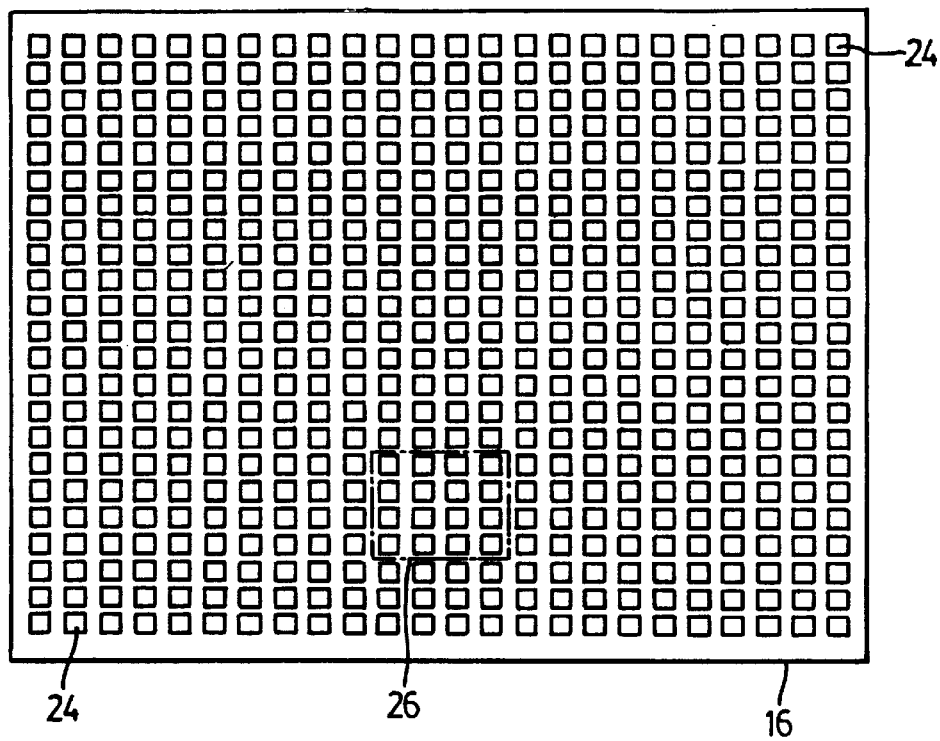
FIG. 3 is a front plan view of an electronic display device displaying a matrix of illuminated video dots.

FIG. 2 shows a system for measuring electron beam profile in an electronic display device in accordance with the present invention and is generally indicated to by reference numeral 10. As can be seen, the system 10 includes a sensor 12 preferably of the type manufactured by Image processing Systems Inc. of Markham, Ontario under model number ADI 5200. The sensor includes a color CCD camera (not shown) having a field of view to allow high resolution images of illuminated phosphor dots displayed by an electronic display device 16 under inspection to be captured. The sensor 12 is coupled to a personal computer 14 containing the required hardware and executing software to allow the images captured by the sensor to be processed so that electron beam profile in the electronic display device 16 can be measured. A video pattern generator 18 is responsive to the personal computer 14 and drives the electronic display device 16 so that desired video patterns are displayed by the electronic display device during testing.

The software executed by the personal computer 14 includes a graphical user interface to allow an operator to select the electron beam whose profile is to be inspected and to display the electron beam profile measurement results.

During testing, the electron beam associated with one of the read, green and blue phosphor dots is selected by an operator via the graphical user interface. The personal computer 14 in turn signals the video pattern generator 18 causing the video pattern generator to drive the electronic display device 16 so that a matrix of video dots or pixels 24 associated with the selected color are illuminated (see FIG. 3).

Once the video dots 24 of the selected color are displayed, the operator holds the sensor 12 against the display screen of the electronic display device 16 so that the field of view 26 of the color CCD camera encompasses the desired area of the display screen to be examined. The CCD camera in turn captures high resolution images of the illuminated video dots within the field of view and conveys the captured images to the personal computer 14 for processing.

Figure 4:
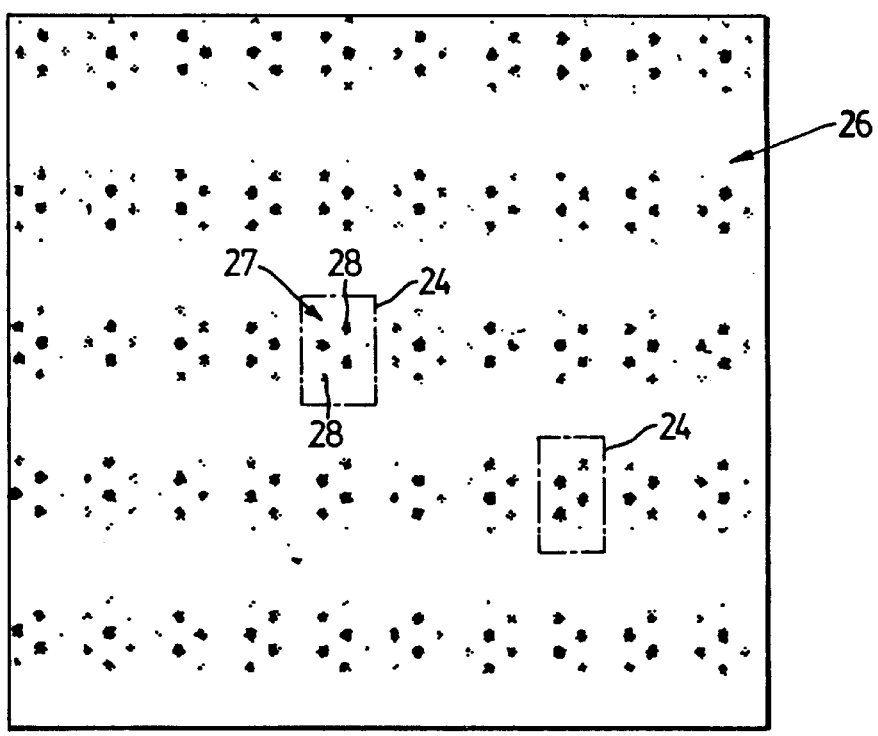
FIG. 4 is an enlarged image of a selection of the illuminated video dots of FIG. 3 within a field of view showing groups of illuminated phosphor dots constituting the illuminated video dots.
Figure 5:
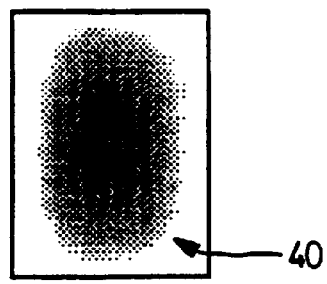
FIG. 5 is an overlay image created by superimposing images of the groups of illuminated phosphor dots constituting illuminated video dots within the field of view and captured in an image.

FIG. 4 illustrates an enlarged image of the illuminated video dots within the field of view 26 captured by the color CCD camera. As can be seen, each illuminated video dot 24 is comprised of a group 27 of illuminated phosphor dots 28. The phosphor dots 28 in each group 27 are typically illuminated at different intensity levels as a result of electron beam intensity variations with the electron beam profile.

At each high resolution image is captured by the CCD camera. The sensor 12 conveys the captured image to the personal computer 14. Once a captured image has been received by the personal computer 14, the software processes the captured image data. Specifically, software determines the center of mass of the diagonally furthest video dots in the captured image. The horizontal and vertical distances between the center of masses of these video dots are then determined and are divided by the number of video dots in the field of view to calculate the average video dot pitch. After the horizontal and vertical video dot distances have been calculated, the software overlies the groups 27 of illuminated phosphor dots forming the illuminated video dots 24 captured in the image to create a superposition or overlay image 40 of illuminated phosphor dots representing the electron beam (see FIG. 5). During this stage, if phosphor dots directly overlie one another, only the maximum brightness CCD camera pixel values are used to create the overlay image 40.

The illumination pattern of groups of phosphor dots constituting illuminated video dots which are spatially shifted by an integer number of the shadow mask pitch will generally be the same and therefore, will yield the same information concerning the profile of the electron beam illuminating the phosphor dots. It is therefore desired that the illuminated video dots be spatially shifted by a fraction of the shadow mask pitch before the image is captured by the CCD camera and the overlay image 40 created. This is achieved either by changing the horizontal or vertical size of the electronic display device's display or by varying the separation distance of the illuminated video dots. When the illuminated video dots 24 are spatially shifted by a fraction of the shadow mask pitch, the illumination pattern of the phosphor dots associated with each video dot in the field of view will generally be different and therefore, each group of illuminated phosphor dots will provide different data concerning the profile of the electron beam impinging on the phosphor dots.

Once the overlay image 40 is created, the software approximates the overlay image at a plurality of predefined number of intensity levels or cross-sections in the 5% to 90% range of peak intensity by calculating ellipses using Fourier elliptical beam decomposition. An assumption that the electron beam cross-section can be approximated by ellipses is made. Following this, horizontal and vertical electron beam profiles are calculated from the ellipse parameters.

Figure 6:
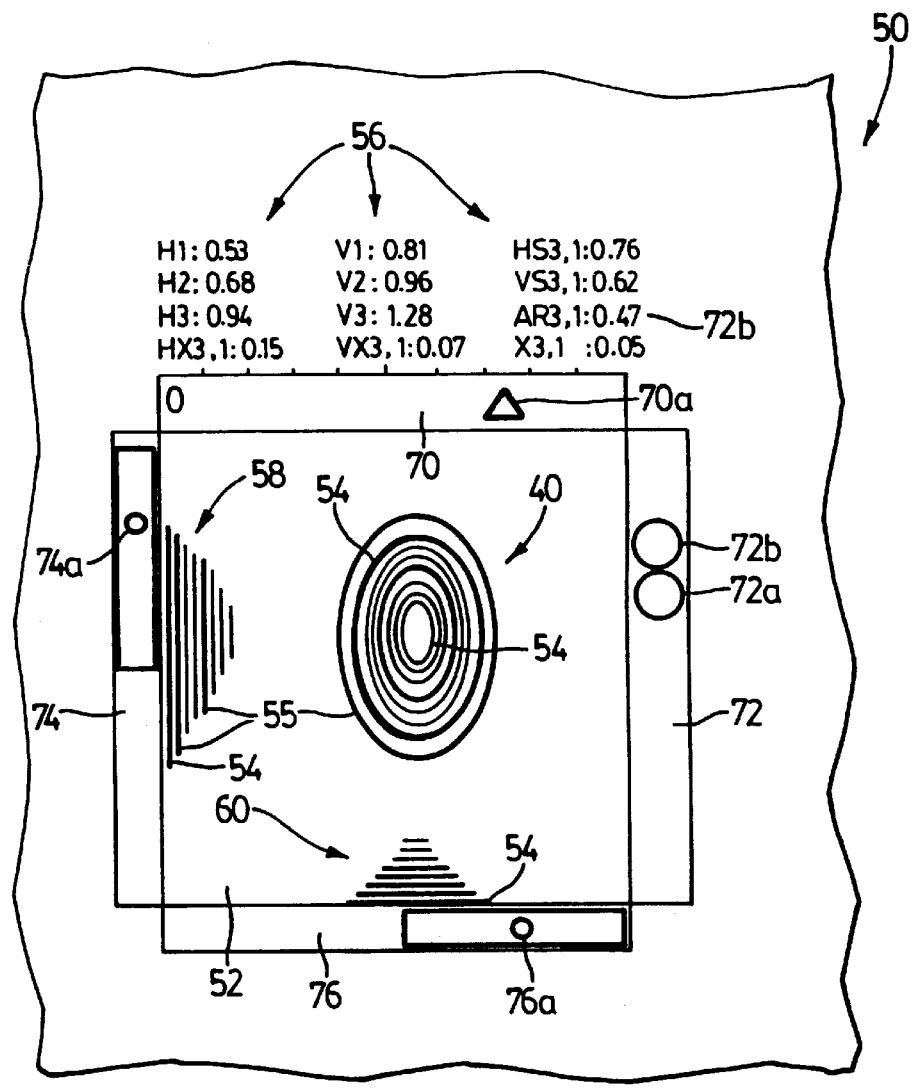
FIG. 6 is an illustration of a graphical user interface used to present measured electron beam profile data.

The calculated ellipses at the predefined cross-sectional that approximate the electron beam the horizontal and vertical electron beam profiles and other calculated information is displayed to the operator via the graphical user interface. FIG. 6 shows a window 50 of the graphical user interface presenting the above information. As can be seen, the display screen 50 includes a central display area 52 in which the ellipses 54 are presented. A subset 55 of best fit ellipses 54 can be selected for dimensional measurement that are highlighted within the display area 52. Also, numerical horizontal and vertical dimension and slope or ratio data 56 concerning the subset 55 of best fit ellipses 54 is provided above the central display area. In the example shown in FIG. 6, three best fit ellipses are selected and form subset 55.

Presented at the left side of the central display area 52 is a vertical electron beam profile 58 and presented at the bottom of the central display area 52 is a horizontal electron beam profile 60. The profile lines of the profiles 58 and 60 associated with the selected best fit ellipses 54 forming subset 55 are also highlighted. As mentioned above, the horizontal and vertical electron beam profiles 58 and 60 are calculated from the parameters of the best fit ellipses.

Bordering the central display area 52 are a plurality of graphical meters. The graphical meter 70 below the numerical data 56 includes an indicator 70a presenting the peak intensity of the overlay image 40 at a given cross-section. The graphical meter 72 to the right of the central display area 52 displays the ratio of the area of two best fit ellipses 54 at user specified intensity levels expressed as a percentage. In the present example, the user specified intensity levels are 10% and 50%. The area ratio is one possible method of indicating the quality of focus. During focus adjustments, the graphical meter 72 presents an indication 72a showing the current area ratio of the two best fit ellipses 54 but maintains an indicator 72b showing the previous best focus area ratio to allow the operator to return to that point if more recent focus adjustments do not improve focus. The best focus area ratio is also presented in the numerical data area 56.

Figure 7B:
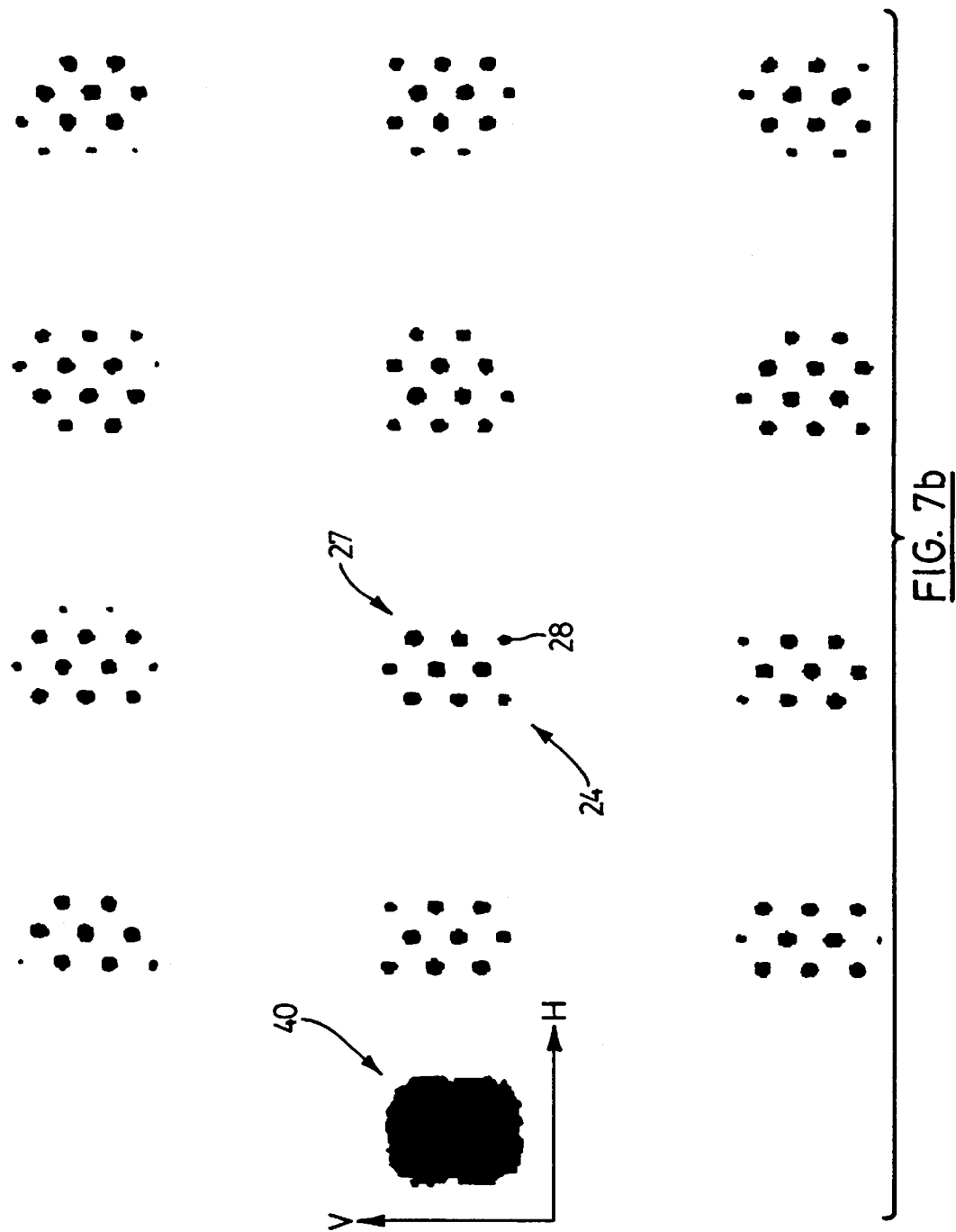

The graphical meters 74 and 76 to the left and below the central display area 52 include indicators 74a and 76a respectively presenting vertical and horizontal quality factors indicating whether gaps exist between illuminated phosphor dots in the overlay image 40. The quality factors are determined by calculating the sum of gaps from the phosphor dot dimension to phosphor dot pitch ratio and the distribution of phosphor dots in the overlay image, both horizontally and vertically. FIGS. 7a and 7b illustrate groups 27 of illuminated phosphor dots 28 constituting illuminated video dots 24 and resulting overlay images for different conditions. In FIG. 7a. the alignment of video dots to phosphor dots is good in the vertical direction but non-ideal in the horizontal direction. The result is vertical gaps in the overlay image 40. In FIG. 7b, the alignment of video dots to phosphor dots is good in both vertical and horizontal directions resulting in a "filled" overlay image 40.

By processing the video dot and phosphor dot image data as described above, the data is significantly condensed to a manageable size allowing the data to be processed in real time. Currently, the present system 10 allows electron beam profile measurements to be made and displayed at a rate equal to about 10 frames per second, a rate approximately 50 times faster than methods which require the electron beams to be shifted to measure electron beam profile.

As will be appreciated, the present invention provides a simple method of measuring beam profile in an electronic display device which does not require electron beams to be shifted and frames of electron beam profile image data to be taken at each shifted position. The video dot and phosphor data image data captured by the present system is processed to provide real time measurements of electron beam profile.

Although the sensor 12 has been described as being held against the display screen of the electronic display device 16 under inspection to capture images within the field of view, in an alternative arrangement, the sensor may be positioned at a distance from the display screen of the electronic display device. In this case, the sensor 12 will also include a suitable lens to allow the CCD camera in the sensor to capture the desired image of the field of view.

Although the system 10 has been described as measuring electron beam profile to evaluate focus in an electronic display device, since the system 10 includes a sensor having a color CCD camera, the system 10 can also be used to evaluate convergence in an electronic display device. In this case, the video pattern generator 18 is conditioned by the personal computer 14 to drive the electronic displace device 16 as that all three color electron beams illuminate their respective matrix of video dots. The color CCD camera within the sensor simultaneously captures an image of all three color video dots illuminated within the field of view. Once the image is captured, the image is conveyed to the personal computer for processing.

When the captured image is received, the software in the personal computer generates three overlay images, one for each color, in the same manner described previously by processing the groups of illuminated phosphor dots constituting the illuminated video dots of each color separately. Thus, overlay images of the three electron beams in a single frame are generated. Once the overlay images are generated the spatial distribution of each electron beam is determined and a convergence error is calculated. The calculated convergence is of course presented in a window of the graphical user interface.

Although particular embodiments of the present invention have been described, those of skill in the art will also appreciate that variations and modifications may be made to the present invention without departing from the spirit and scope thereof as defined by the appended claims.

We claim:

1. A method of measuring electron beam profile in an electronic display device comprising the steps of:

displaying an array of video dots on a display screen of said electronic display device, each of said video dots being comprised of a group of phosphor dots illuminated by an electron beam;

taking an image of a plurality of groups of illuminated phosphor dots forming video dots within a field of view;

determining average horizontal and vertical distances of the video dots within said field of view; and superimposing each of said groups of illuminated phosphor dots forming the video dots in said field of view that are captured in said image based on the average horizontal and vertical distances of the video dots in said field of view generally to average and fill in discontinuities between phosphor dots in said groups and thereby generate an overlay image of said electron beam.

2. The method of claim 1 further comprising the step of taking cross-sections of said overlay image and generating at least one intensity profile of said electron beam corresponding to at least one of said cross-sections.

3. The method of claim 1 wherein horizontal and vertical intensity profiles of said electron beam are calculated using parameters of said mathematical approximations.

4. The method of claim 3 further comprising the step of calculating dimensions of said horizontal and vertical intensity profiles at a percentage threshold of the maximum intensity of said electron beam.

5. The method of claim 4 wherein said percentage threshold is user selectable.

6. The method of claim 2 wherein said cross-sections are approximated by calculating best fit ellipses encircling phosphor dots forming said overlay image.

7. The method of claim 6 wherein said best fit ellipses are calculated using Fourier elliptical decomposition.

8. The method of claim 3 further comprising the step of calculating areas of cross-sections at two defined intensity levels and determining the area ratio therebetween to provide an indication of focus quality.

9. The method of claim 8 further comprising the step of providing a graphical and numerical display of the determined area ratio.

10. The method of claim 9 further comprising the step of maintaining a display of the determined area ratio indicating the best focus quality.

11. The method of claim 10 further comprising the step of presenting a display indicating gaps between phosphor dots in said overlay image.

12. The method of claim 11 wherein a pair of indicators are presented, one of said indicators indicating gaps between phosphor dots in said overlay image in a horizontal direction and the other of said indicators indicating gaps between phosphor dots in said overlay image in a vertical direction.

13. The method of claim 3 further comprising the step of visually presenting an indication of the peak intensity of said overlay image at a given cross-section.

14. The method of claim 1 wherein during said display step, arrays of red, green and blue video dots are displayed by illuminating respective groups of phosphor dots by red, green and blue electron beams and wherein during said superimposing step, the groups of illuminated phosphor dots constituting illuminated video dots of each color are superimposed separately to generate overlay images of red, green and blue electron beams.

15. The method of claim 14 further comprising the steps of comparing the spatial distribution of the red, green and blue electron beams based on said overlay images and calculating a convergence error therefrom.

16. A system for measuring electron beam profile in an electronic display device comprising:

a video pattern generator to drive said electronic display device to cause said electronic display device to display an array of video dots on a display screen thereof, each of said video dots being comprised of a group of phosphor dots illuminated by an electron beam;

a sensor to take an image of a plurality of groups of illuminated phosphor dots forming video dots within a field of view; and a processor in communication with said sensor and receiving said image therefrom, said processor processing said image to determine average horizontal and vertical distances of the video dots within said field of view and superimposing each of said groups of illuminated phosphor dots forming the video dots in said field of view that are captured in said image based on the average horizontal and vertical distances of the video dots in said field of view generally to average and to fill in discontinuities between phosphor dots in said groups and thereby generate an overlay image of said electron beam.

17. A system as defined in claim 16 wherein said processor approximates cross-sections of said overlay image and generates horizontal and vertical intensity profiles of said electron beam.

18. A system as defined in claim 17 further including a display to display said approximated cross-sections and said horizontal and vertical intensity profiles.

19. A system as defined in claim 16 wherein said video pattern generator causes said display to display arrays of red, green and blue video dots illuminated by respective red, green and blue electron beams, said processing means superimposing separately, groups of illuminated phosphor dots constituting video dots of each color to generate overlay images of said red, green and blue electron beams.

20. A system as defined in claim 19 wherein said processing means compares the spatial distribution of said red, green and blue electron beams based on said overlay images and calculates a convergence effort therefrom.

21. The method of claim 2 wherein said cross-sections are approximated by calculating mathematical approximations of the perimeter of the phosphor dots forming the overlay image at said cross-sections.

22. The method of claim 1 wherein the horizontal and vertical distances are determined by measuring the horizontal and vertical distances between the center of masses of the diagonally furthest video dots within said field of view.

23. The method of claim 22 further comprising the step of dividing the horizontal and vertical distances by the number of video dots in said field of view to calculate an average video dot pitch.

24. The method of claim 1 wherein during the superimposing step, if phosphor dots of different groups directly overlie one another when superimposed, only the brightest of those phosphor dots is used to generate said overlay image.

25. The method of claim 1 further comprising the step of, prior to said displaying step, spatially shifting the video dots by a fraction of the pitch of a shadow mask forming part of said electronic display device.

26. The method of claim 25 wherein said shifting step is performed either by changing the horizontal or vertical size of the display area of said display screen or by varying the separation distance of the video dots.

27. A method of measuring electron beam profile in an electronic display device including a display screen and a shadow mask, said method comprising the steps of:

illuminating video dots on said display screen, said video dots being spatially shifted by a fraction of the pitch of said shadow mask, each of said video dots being comprised of a group of phosphor dots illuminated by an electron beam;

taking an image of a plurality of groups of illuminated phosphor dots forming an array of video dots within a field of view;

determining average horizontal and vertical distances of the video dots within said field of view by measuring the distances between the center of masses of the diagonally furthest video dots within said field of view; and superimposing each of the groups of illuminated phosphor dots forming the video dots in said field of view that are captured in the image based on the average horizontal and vertical distances of the video dots in said field of view generally to average and fill in discontinuities between phosphor dots in the groups and thereby generate an overlay image of said electron beam.

28. The method of claim 27 wherein during the superimposing step, if phosphor dots of different groups directly overlie one another, only the brightest of those phosphor dots is used to generate said overlay image.

29. The method of claim 28 wherein the video dots are spatially shifted either by changing the horizontal or vertical size of the display area of said display screen or by varying the separation distance of the video dots.

30. The method of claim 27 further comprising the step of taking cross-sections of said overlay image by approximately the perimeter of the phosphor dots forming said overlay image at said cross-sections and generating intensity profiles of said electron beam corresponding to said cross-sections.

31. The method of claim 30 wherein said cross-sections are approximated by calculating best fit ellipses encircling the phosphor dots forming said overlay image at said cross-sections.

32. The method of claim 31 wherein said best fit ellipses are calculated using Fourier elliptical decomposition.

* * * * *